(12) United States Patent
Moghaddam et al.

(10) Patent No.: US 11,263,563 B1
(45) Date of Patent: Mar. 1, 2022

(54) COHORT-BASED GENERALIZED LINEAR MIXED EFFECT MODEL

(71) Applicant: Microsoft Technology Licensing, LLC, Redmond, WA (US)

(72) Inventors: Samaneh Abbasi Moghaddam, Santa Clara, CA (US); Xiaoqing Wang, San Jose, CA (US); Xiaowen Zhang, Santa Clara, CA (US); SeyedMohsen Jamali, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 16/366,964

(22) Filed: Mar. 27, 2019

(51) Int. Cl.
*G06Q 10/00* (2012.01)
*G06Q 10/06* (2012.01)
*G06N 20/00* (2019.01)
*G06Q 10/10* (2012.01)
*G06F 16/2457* (2019.01)

(52) U.S. Cl.
CPC ............... *G06Q 10/063112* (2013.01); *G06F 16/24578* (2019.01); *G06N 20/00* (2019.01); *G06Q 10/1053* (2013.01)

(58) Field of Classification Search
CPC ........ G06Q 10/063112; G06Q 10/1053; G06F 16/24578; G06N 20/00
See application file for complete search history.

(56) References Cited

U.S. PATENT DOCUMENTS

| 10,607,189 | B2* | 3/2020 | Kenthapadi | G06Q 50/01 |
| 10,679,187 | B2* | 6/2020 | Kenthapadi | G06Q 10/1053 |
| 2010/0324970 | A1* | 12/2010 | Phelon | G06Q 10/1053 705/321 |
| 2016/0034852 | A1* | 2/2016 | Kapur | G06Q 10/1053 705/321 |
| 2016/0292288 | A1* | 10/2016 | Walton | G06F 16/335 |
| 2017/0364867 | A1* | 12/2017 | Potratz | G06F 16/24575 |
| 2018/0218327 | A1* | 8/2018 | Kenthapadi | G06Q 10/1053 |
| 2018/0315019 | A1* | 11/2018 | Kenthapadi | G06N 7/005 |
| 2019/0019157 | A1* | 1/2019 | Saha | G06F 16/9535 |
| 2019/0034792 | A1* | 1/2019 | Kataria | G06Q 10/1053 |
| 2019/0034882 | A1* | 1/2019 | Saha | G06Q 50/01 |
| 2019/0050750 | A1* | 2/2019 | Le | G06F 16/9535 |

* cited by examiner

*Primary Examiner* — Rutao Wu
*Assistant Examiner* — Tyrone E Singletary
(74) *Attorney, Agent, or Firm* — Schwegman Lundberg & Woessner, P.A.

(57) ABSTRACT

In an example embodiment, cohort-based generalized linear mixed effect model (GLMIX) training is performed to identify patterns across cohorts of users, rather than slicing across all users blindly without accounting for common characteristics of users. Thus, rather than performing GLMIX training at just the finest granular level (e.g., user-level and job-level) or the highest level (global level), a "medium" level of granularity is used to train the GLMIX model at cohort-level.

20 Claims, 7 Drawing Sheets

COHORT-BASED GENERALIZED LINEAR MIXED EFFECT MODEL

TECHNICAL FIELD

The present disclosure generally relates to technical problems encountered in searches on computer networks. More specifically, the present disclosure relates to the use of a cohort-based generalized linear mixed effect model to improve online searches.

BACKGROUND

The rise of the Internet has occasioned an increase in the use of these online services to perform searches for jobs that have been posted on or linked to by the online services.

These job searches may either be performed explicitly by, for example, a user typing in a search query looking for particular jobs, or implicitly, by presenting the user with job listings the system thinks the user will be interested in. The latter may be presented in an area of a graphical user interface termed "Jobs You May Be Interested In."

In either the implicit or explicit case, results are presented based on scoring of potential results using a machine-learned model. In the case of explicit searches, the explicit search query is a large factor in the scoring of the results (which would evaluate match features such as how often terms that appear in the query appear in the results). In the case of implicit searches, match features are not used as no explicit search query is provided, but other features may be evaluated to score the results. These include global features, per-user features, and per-job features.

Historically, algorithms to rank job search results in response to an explicit query have heavily utilized text and entity-based features extracted from the query and job postings to derive a global ranking. However, when such global ranking algorithms are modified to improve certain queries, other queries tend to become degraded. Specifically, the queries that often become degraded are those where personalization is desired. When such text and entity-based features are more difficult to obtain, such as where no explicit query is provided, implicit features may be used.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
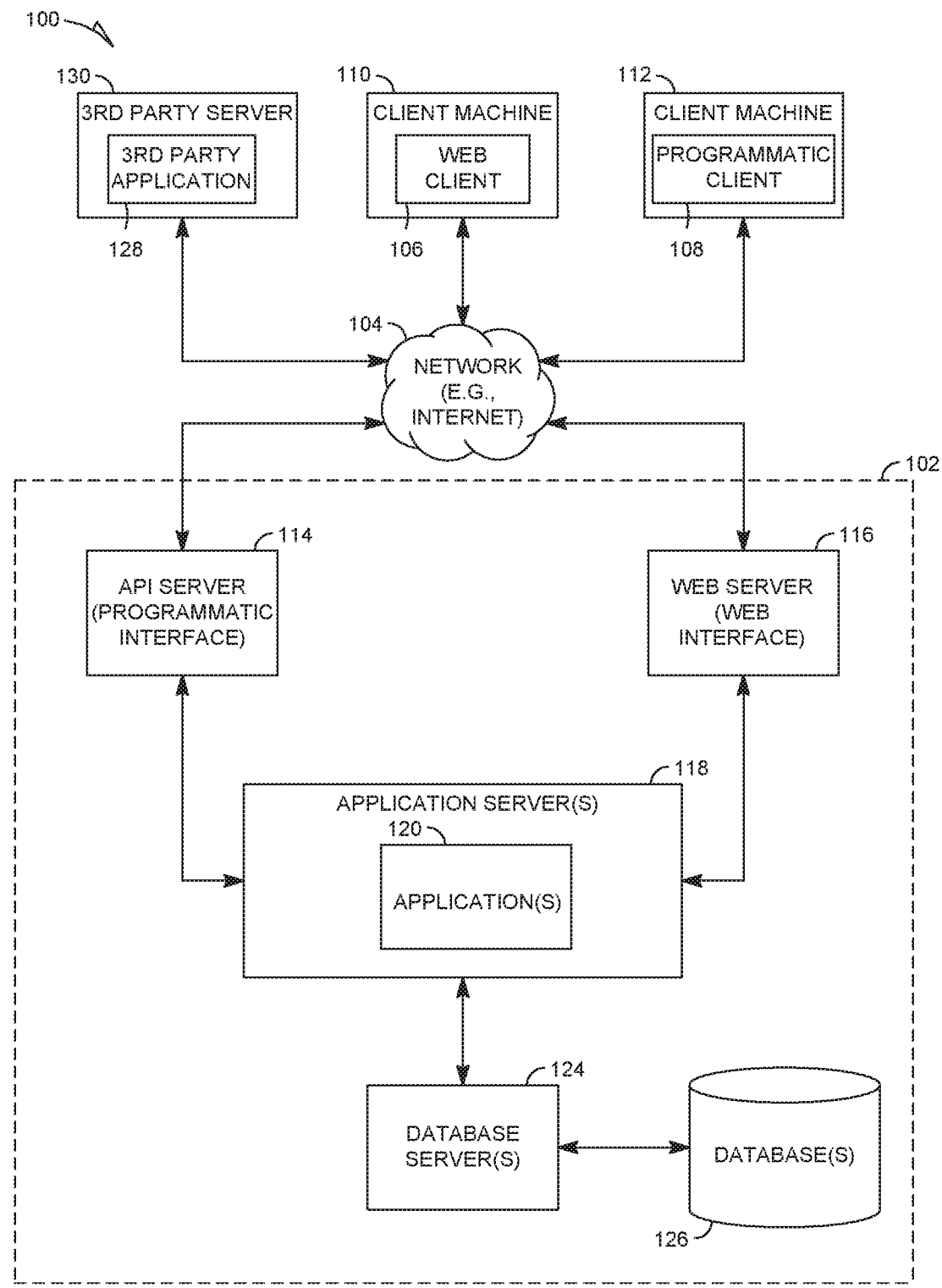
FIG. 1 is a block diagram illustrating a client-server system, in accordance with an example embodiment.

In an example embodiment, cohort-based generalized linear mixed effect model (GLMIX) training is performed to identify patterns across cohorts of users, rather than slicing across all users blindly without accounting for common characteristics of users. Thus, rather than performing GLMIX training at just the finest granular level (e.g., user-level and job-level) or the highest level (global level), a "medium" level of granularity is used to train the GLMIX model at cohort-level.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, GLMIX models are used to improve job listing results. In the context of job searching, one key aspect is to show the best jobs to a user based on his or her query, according to some measure. In one example embodiment, this measure may be quantified as the likelihood of user m applying for job j if served when he or she enters the query q, measured by the binary response $y_{mjs}$. $s_j$ denotes the feature vector of job j, which includes features extracted from the job posting, such as the job title, summary, location, desired skills, and experience needed. $x_{mjq}$ represents the overall feature vector for the (m, j, q) triple, which can include user, job, query, and associated context features and any combination thereof.

Specifically, a generalized mixed effect model is trained using sample job posting results and sample user data, including information that particular users applied to particular sample job posting results (or otherwise expressed interest in the results). The generalized mixed effect model is then trained on the space of job-features in addition to a global model. This allows finer signals in the training data to be captured, thus allowing for better differentiation on how the presence of a particular job skill should generate job posting results as opposed to another skill. Further, the generalized mixed effect model is trained on the space of user-features in addition to the global model and the job-features aspect. This allows for better differentiation on how the presence of particular job attributes should generate job posting results.

An issue that arises, however, is in what is called a "cold-start" environment. In such an environment, a per-user portion of the GLMIX model is not yet trained because there is not enough information about the individual user. For example, a user may be new to the system, and thus may never have viewed or responded to job postings before. Even if one begins training the per-user model for new applicants on the day they apply, this does not mean that all user activities are used in training the model. The model may utilize all the user's job activities (e.g., applies, saves, dismisses, and skips) from the first day they applied, but for days before that the system has no data as he or she was not part of the target set on previous days. Additionally, for non-applicants (also known as aspirants), the GLMIX model would ignore all activities of aspirants, and as a result such aspirants will always be served by the global model. However, the global model is also biased towards applicants rather than aspirants, because no activities of aspirants are used in the global model training (since they are not in the model target set). The result is that non-personalized jobs get recommended for this group of users.

In an example embodiment, cohort-based GLMIX training is performed to identify patterns across cohorts of users, rather than slicing across all users blindly without accounting for common characteristics of users. Thus, rather than performing GLMIX training at just the finest granular level (e.g., user-level and job-level) or the highest level (global level), a "medium" level of granularity is used to train the GLMIX model at cohort-level.

A cohort is a grouping of users based on one or more common characteristics. These cohorts may be based on any number of different common factors, such as job title, seniority, company, etc. In an example embodiment, combinations of common attributes may be used to define a cohort, such as a common title and a common industry (called a title-industry cohort), a common supertitle, a common seniority, and a common company size (called a supertitle-seniority-company size cohort), or a common title and a common company (called a title-company cohort).

In some example embodiments the cohorts are identified only in aspirants, not in applicants. Here, for each cohort of aspirants, a per-cohort model is trained. Applicants will still be able to get a personalized score from the per-user model while aspirants will get a semi-personalized score from the per-cohort model for the cohort they belong to. Here, the final score for a user will be defined as:
Job scoring for an applicant:

$$score=global\_score+per\_user\_score+per\_job\_score$$

Job scoring for an aspirant user:

$$score=global\_score+per\_cohort\_score+per\_job\_score$$

This approach has the advantage of not affecting an applicant's model with data from aspirant users, but it has the disadvantage of using two models (one for applicants and one for aspirant users).

Alternatively, cohorts are identified in both aspirants and applicants, which would allow a single model to be used but could potentially cause aspirant data to affect an applicant's model.

In an example embodiment, after training the global model, for each cohort of users a per-cohort model is trained. Following that, the per-user model can be trained. Thus, the ordering of training is (1) global, (2) per-cohort, (3) per-user.

DETAILED DESCRIPTION

A current GLMIX model prediction of probability of user m applying for job j is as follows:

$$g(E[y\_mj])=x\_mj*b+s\_j*alpha\_m+q\_m*beta\_j$$

where:
y_mj: a binary response whether user m will apply to job j
g(E[y_mjt])=log (E[y_mjt]/1−E(y_mjt))
x_mjt: global feature vector (include user, job, and cross features)
b: the global coefficient vector
s_j: feature vector for job j
alpha_m: user coefficient (user random effects)
q_m: feature vector for user m
beta_j: job coefficient (job random effect)

In an example embodiment, at the scoring time, all users will get a per-cohort score and only applicants will get a personalized per-user score, i.e., $$g(E[y\_mj])=x\_mj*b+s\_j*gamma\_m+s\_j*alpha\_m+q\_m*beta\_j$$

where:
gamma_m: user-cohort coefficients (user-cohort random effects)
Job scoring for an applicant:

$$score=global\_score+per\_user\_cohort\_score+per\_user\_score+per\_job\_score$$

Job scoring for an aspirant user $$score=global\_score+per\_user\_cohort\_score+per\_job\_score$$

This idea can also be expanded to the job model and per-job-cohorts can be defined. In that case, the final score for a user will be defined as:

$$g(E[y\_mj])=x\_mj*b+s\_j*gamma\_m+s\_j*alpha\_m+q\_m*delta\_j+q\_m*beta\_j$$

where:
gamma_m: user-cohort coefficients (user-cohort random effects)
delta_j: job-cohort coefficients (job-cohort random effect)

$$score=global\_score+per\_user\_cohort\_score+per\_user\_score+per\_job\_cohort\_score+per\_job\_score$$

where the per_job_score is zero for fresh jobs. This model can address the cold start problem with the fresh jobs as currently the per-job model is only trained when the job gets user activities on it. Embodiments are also possible where per-job cohorts are utilized without per-user cohorts.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
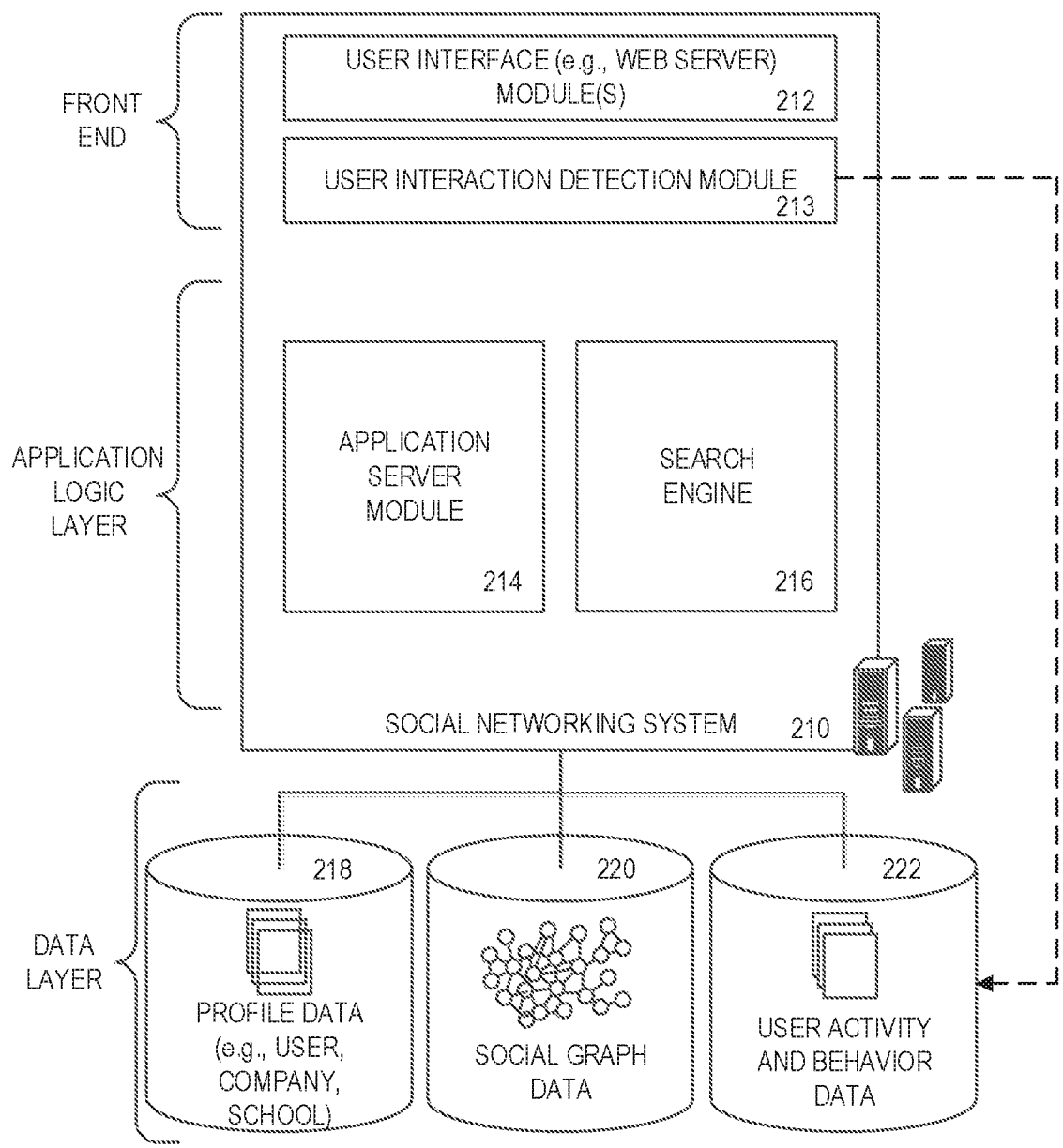
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that users have with different applications 120, services, and content presented. As shown in FIG. 2, upon detecting a particular interaction, the user interaction detection module 213 logs the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family users' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level, or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, or relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and user activity and behavior data (stored, e.g., in the user activity and behavior database 222), as well as job postings. The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
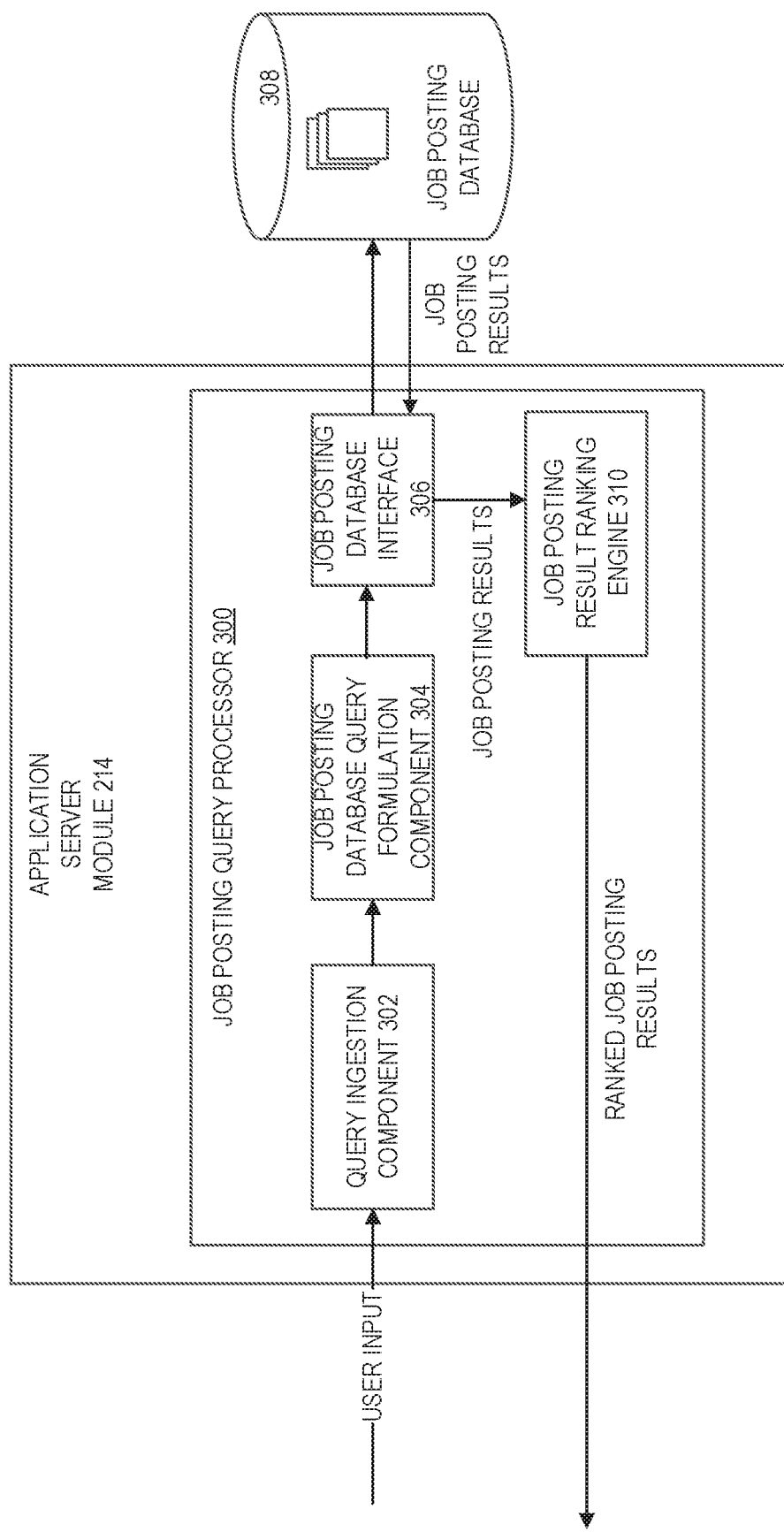
FIG. 3 is a block diagram illustrating an application server module of FIG. 2 in more detail, in accordance with an example embodiment.

FIG. 3 is a block diagram illustrating application server module 214 of FIG. 2 in more detail, in accordance with an example embodiment. While, in many embodiments, the application server module 214 will contain many subcomponents used to perform various different actions within the social networking system, in FIG. 3 only those components that are relevant to the present disclosure are depicted. A job posting query processor 300 comprises a query ingestion component 302, which receives a user input "query" related to a job posting search via a user interface (not pictured). Notably, this user input may take many forms. In some example embodiments, the user may explicitly describe a job posting search query, such as by entering one or more keywords or terms into one or more fields of a user interface screen. In other example embodiments, the job posting query may be inferred based on one or more user actions, such as selection of one or more filters, other job posting searches by the user, searches for other users or entities, etc.

This "query" may be sent to a job posting database query formulation component 304, which formulates an actual job posting database query, which will be sent via a job posting database interface 306 to job posting database 308. Job posting results responsive to this job posting database query may then be sent to the job posting result ranking engine 310, again via the job posting database interface 306. The job posting result ranking engine 310 then ranks the job posting results and sends the ranked job posting results back to the user interface for display to the user.

Figure 4:
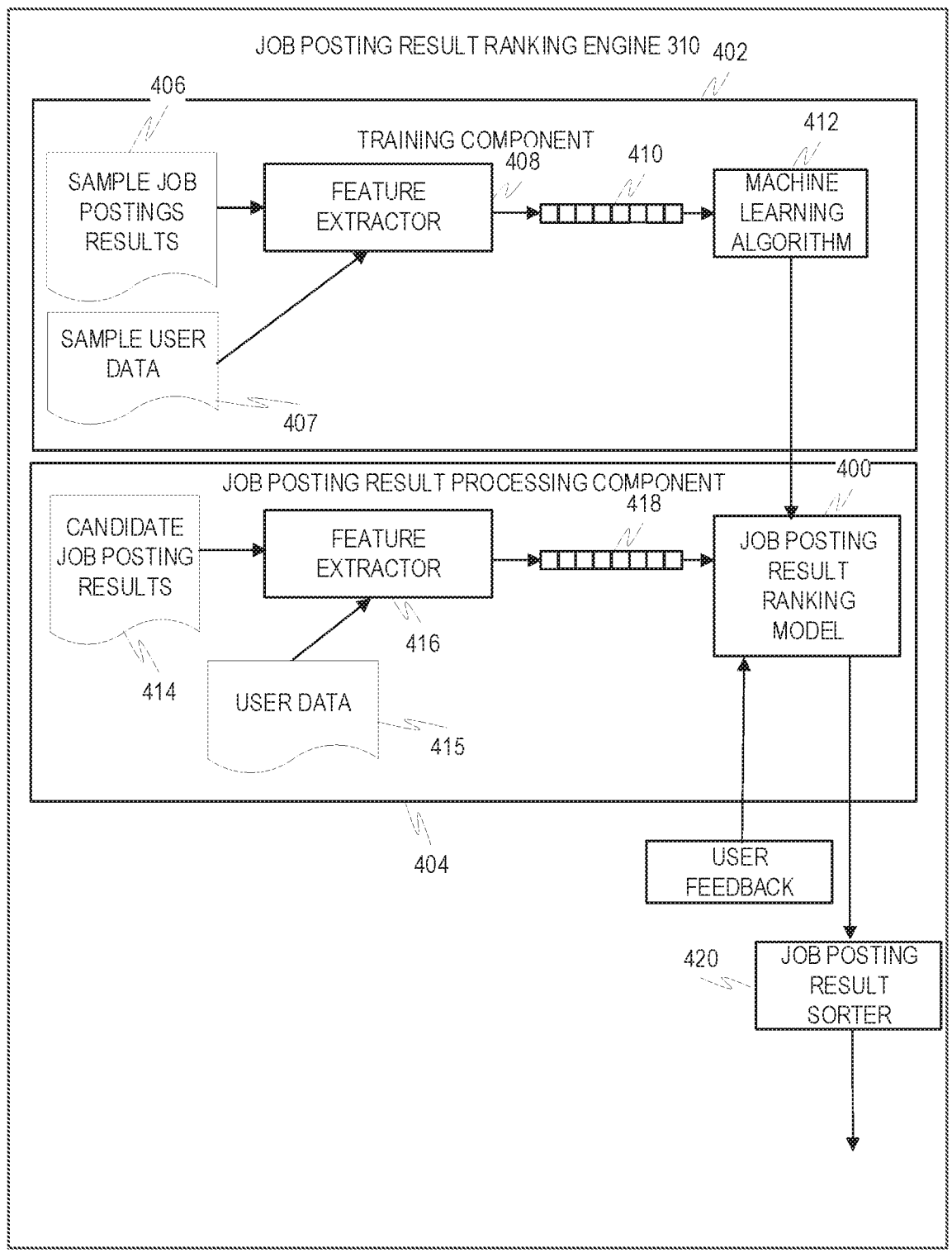
FIG. 4 is a block diagram illustrating a job posting result ranking engine of FIG. 3 in more detail, in accordance with an example embodiment.

FIG. 4 is a block diagram illustrating job posting result ranking engine 310 of FIG. 3 in more detail, in accordance with an example embodiment. The job posting result ranking engine 310 may use machine learning techniques to learn a job posting result ranking model 400, which can then be used to rank actual job posting results from the job posting database 308.

The job posting result ranking engine 310 may comprise a training component 402 and a job posting result processing component 404. The training component 402 feeds sample job postings results 406 and sample user data 407 into a feature extractor 408 that extracts one or more features 410 for the sample job postings results 406 and sample user data 407. The sample job postings results 406 may each include job postings results produced in response to a particular query as well as one or more labels, such as a job posting application likelihood score, which is a score indicating a probability that a user with a corresponding sample user data 407 will apply for the job associated with the corresponding sample job postings result 406.

Sample user data 407 may include, for example, a history of job searches and resulting expressions of interest (such as clicking on job posting results or applications to corresponding jobs), in particular job posting results for particular users. In some example embodiments, sample user data 407 can also include other data relevant for personalization of the query results to the particular user, such as a user profile for the user or a history of other user activity.

A machine learning algorithm 412 produces the job posting result ranking model 400 using the extracted features 410 along with the one or more labels. In the job posting result processing component 404, candidate job postings results 414 resulting from a particular query are fed to a feature extractor 416 along with candidate user data 415. The feature extractor 416 extracts one or more features 418 from the candidate job postings results 414 and candidate user data 415. These features 418 are then fed to the job posting result ranking model 400, which outputs a job posting application likelihood score for each candidate job postings result for the particular query.

This job posting application likelihood score for each candidate job postings result may then be passed to a job posting result sorter 420, which may sort the candidate job postings results 414 based on their respective job posting application likelihood scores.

It should be noted that the job posting result ranking model 400 may be periodically updated via additional training and/or user feedback. The user feedback may be either feedback from users performing searches, or from companies corresponding to the job postings. The feedback may include an indication about how successful the job posting result ranking model 400 is in predicting user interest in the job posting results presented.

The machine learning algorithm 412 may be selected from among many different potential supervised or unsupervised machine learning algorithms 412. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, a multi-class logistical regression model is used.

In an example embodiment, the models: g(E[y_mj])=x_mj*b+s_j*gamma_m+s_j*alpha_m+ q_m*beta_j or g(E[y_mj])=x_mj*b+s_j*gamma_m+ s_j*alpha_m+q_m*deltaj+q_m*beta_j may be used.

In an example embodiment, the model(s) described above is/are optimized via alternating optimization using parallelized coordinate descent. Here, the system may alternately optimize for the global features and the per-query features for each query while holding all other variables fixed. Specifically, in one example embodiment, the optimization problems for updating the fixed effects b and random effects Γ are as follows:

$$b = \underset{b}{\mathrm{argmax}}\left\{\log p(b) + \sum_{n\in\Omega}\log p(y_n \mid s_n - x'_n b^{old} + x'_n b)\right\}\gamma_{rl} =$$

$$\underset{\gamma_{rl}}{\mathrm{argmax}}\left\{\log p(\gamma_{rl}) + \sum_{n\mid i(r,n)=l}\log p(y_n \mid s_n z'^{old}_{rn\gamma_{rl}} + z'_{rn\gamma_{rl}})\right\}$$

Incremental updates are performed for $S=\{S_n\}n\in\Omega$ for computational efficiency. More specifically, when the fixed effects b get updated, the following equation is used:

$$s_n^{new} = s_n^{old} - x'_n b^{old} + x_n b^{new}$$

and when the random effects Γ get updated, the following equation is used:

$$s_n^{new} = s_n^{old} - x'_{rn}\gamma_{r,i}^{old}(r,n) + x'_{rn}\gamma_{r,i}^{new}(r,n)$$

As described above, the training component 4 may operate in an offline manner to train the job posting result ranking model 400. The job posting result processing component 404, however, may be designed to operate in either an offline manner or an online manner.

Figure 5:
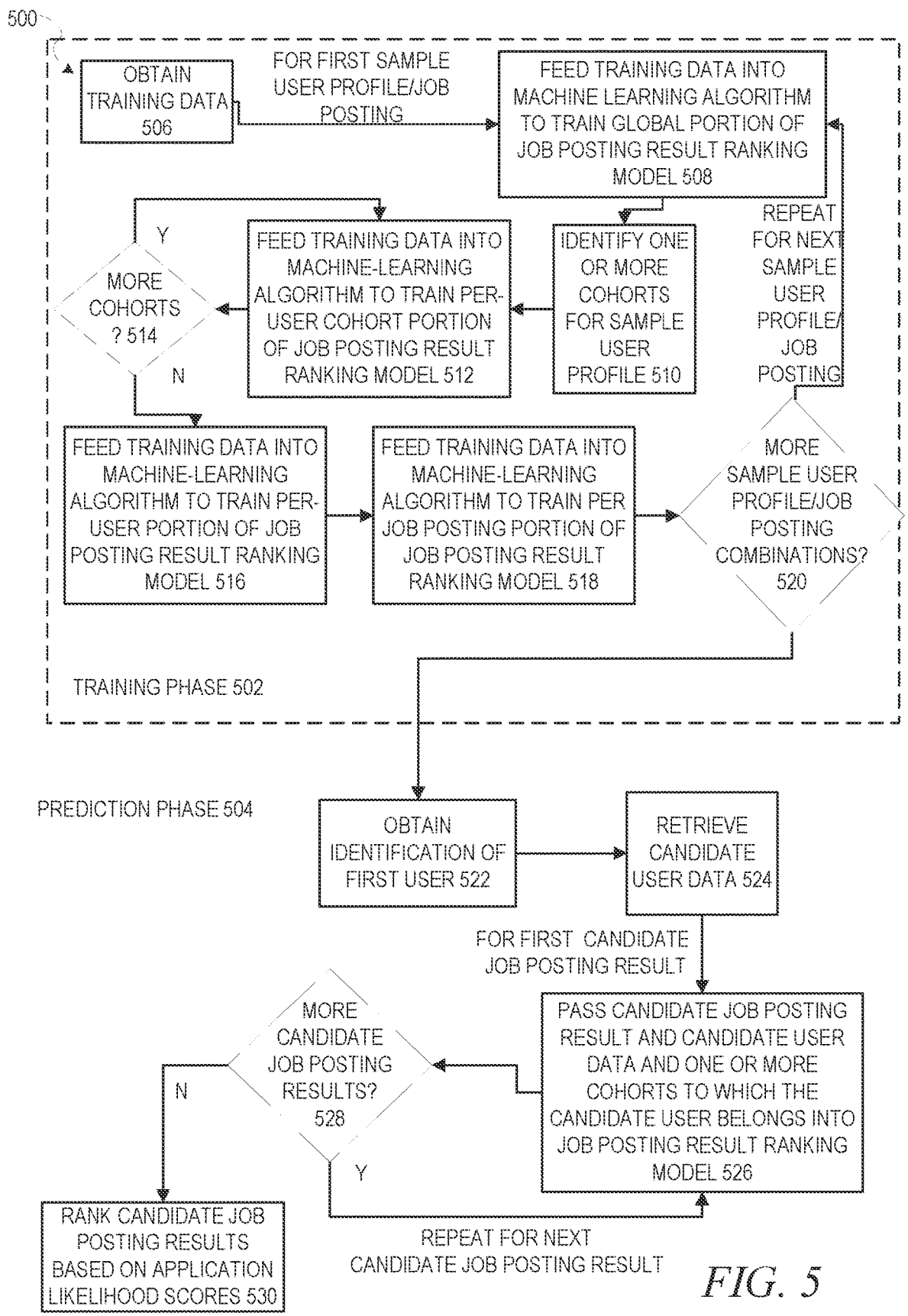
FIG. 5 is a flow diagram illustrating a method to sort candidate job posting results in an online service, in accordance with an example embodiment.

FIG. 5 is a flow diagram illustrating a method 500 to sort candidate job posting results in an online service, in accordance with an example embodiment. This method 500 may be divided into a training phase 502 and a prediction phase 504. In the training phase 502, at operation 506, training data pertaining to sample user profiles and corresponding job posting combinations are obtained. These combinations reflect actions taken by the users corresponding to the sample user profiles to the corresponding job postings. These actions may either be positive or negative, thus indicating positive or negative signals to the underlying machine learning algorithm that will utilize them. The signals may be explicit, including positive signals such as applying for a job corresponding to a job posting or saving a job posting, or negative signals such as dismissing a job (these actions all being taken in a corresponding graphical user interface by, for example, selecting explicit buttons corresponding to these actions), or implicit, including positive signals such as viewing a job posting for a particular period of time or negative signals such as skipping over a job posting.

Then a loop is begun for each of the sample user profile/ job posting combinations. At operation 508, the corresponding training data is fed into a machine learning algorithm 412 to train a global portion of a job posting result ranking model 400 to output a job posting application likelihood score for a candidate job posting result and candidate user data 415. At operation 510, one or more cohorts are identified for the sample user profile. Each cohort represents a different group of users to which a user corresponding to the sample user profile belongs. At operation 512, for the first of these cohorts, the corresponding training data is fed into the machine learning algorithm 412 to train a per-user-cohort portion of the job posting result ranking model 400. At operation 514, it is determined if there are any more cohorts. If so, the method 500 loops back to operation 512 for the next cohort.

If not, then at operation 516, the training data is fed into the machine-learning algorithm to train a per-user portion of the job posting result ranking model. Then, at operation 518, the training data is fed into the machine learning algorithm to train a per-job-posting portion of the job posting result ranking model. At operation 520, it is determined if there are any more sample user profile/job posting combinations. If so, the method 500 may loop back to operation 508 for the next sample user profile/job posting combination. If not, then the method 500 may move to the prediction phase 504.

It should be noted that in embodiments where per-job cohorts are utilized, additional steps of identifying one or more cohorts for the sample job posting and feeding training data for the cohorts into the machine-learning algorithm to train a per-job cohort portion of the job posting result ranking model may be added either just before or just after operations 510-512.

Turning to the prediction phase 504, at operation 522, an identification of a first user of the social networking service is obtained. At operation 524, candidate user data 415 for the first user is retrieved using the identification. Then a loop is begun for each of a plurality of different candidate job posting results 414 retrieved in response to a candidate query from the first user. At operation 526, the candidate job posting result 414 and the candidate user data 415 for the first user, as well as one or more cohorts to which the candidate user belongs, are passed to the job posting result ranking model 400 to generate a job posting application likelihood score for the candidate job posting result 414 and the first user. At operation 528, it is determined if there are any more candidate job posting results 414. If so, then the method 500 may loop back to operation 526 for the next candidate job posting result 414. If not, then at operation 530, the plurality of different candidate job posting results 414 are ranked based on the application likelihood scores.

Figure 6:
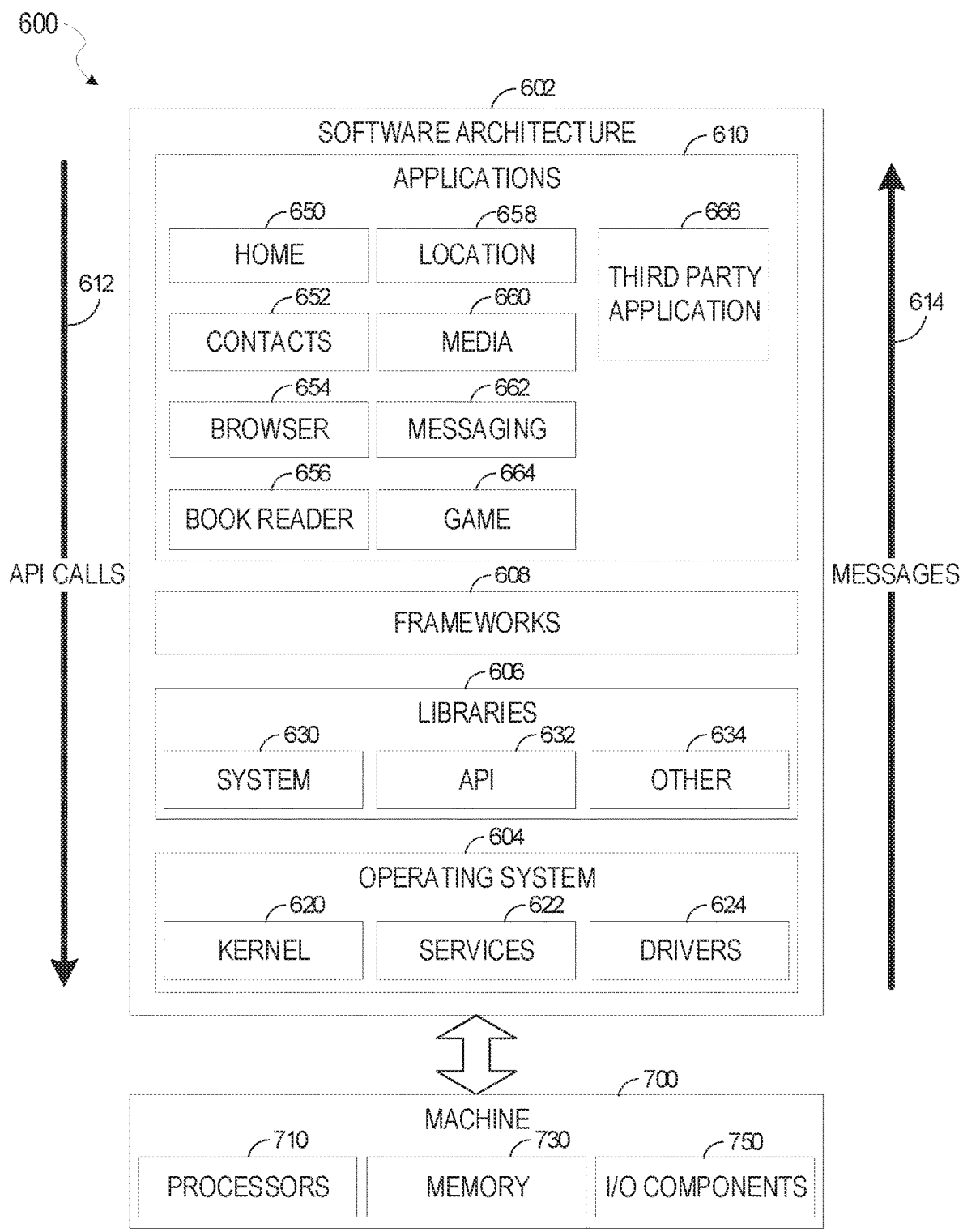
FIG. 6 is a block diagram illustrating a representative software architecture, which may be used in conjunction with various hardware architectures herein described.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various GUI functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
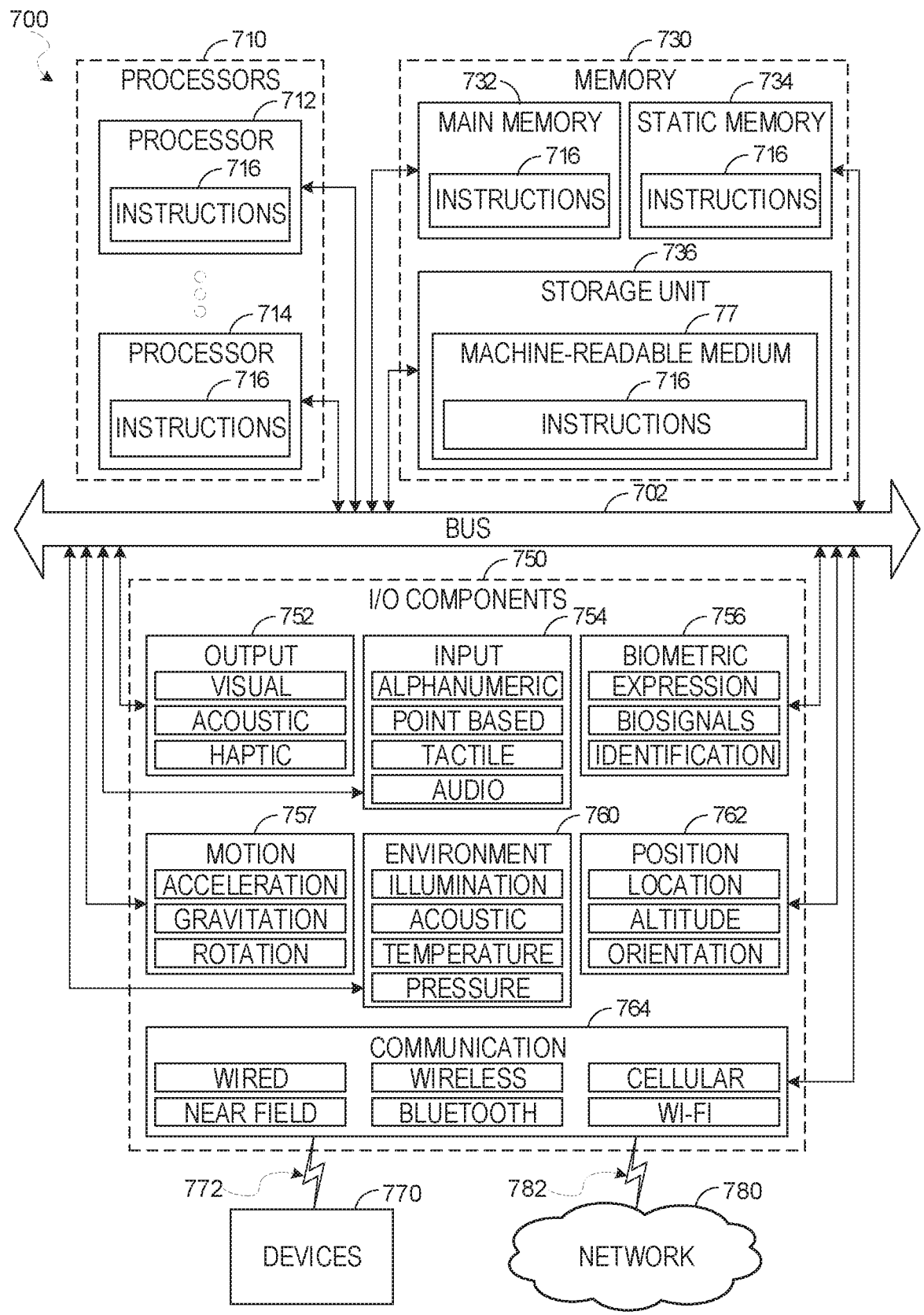
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 illustrates a diagrammatic representation of a machine 700 in the form of a computer system within which a set of instructions may be executed for causing the machine to perform any one or more of the methodologies discussed herein, according to an example embodiment. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein may be executed. For example, the instructions 716 may cause the machine 700 to execute the method 500 of FIG. 5. Additionally, or alternatively, the instructions 716 may implement FIGS. 1-5, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 757, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 757 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to the processors 710. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
    a computer-readable medium having instructions stored thereon, which, when executed by a processor, cause the system to:
    in a training phase:
        obtain training data comprising sample job postings, sample user data corresponding to users, and indications as to which of the sample job postings were interacted with by which users;
        feed the training data into a machine learning algorithm to train a global portion of a job posting result ranking model to output job posting application likelihood scores for an input job posting and an input user;
        for each of one or more cohorts, a cohort comprising a plurality of users, feed the sample job postings that were interacted with by users of the corresponding cohort into the machine learning algorithm to train a per-user-cohort portion of the job posting result ranking model; and
        for one or more of the users, feed the sample job postings associated with the corresponding user and the indications associated with the user into the machine learning algorithm to train a per-user portion of the job posting result ranking model;
    in a prediction phase:
        obtain an identification of a first user of an online service;
        retrieve, using the identification, user data for the first user;
        identify one or more cohorts for the first user based on information in a user profile corresponding to the user;
        for each of a plurality of different job postings, pass the corresponding job posting, the user data for the first user, and the one or more identified cohorts to the job posting result ranking model to generate a job posting application likelihood score for the job posting and the first user; and
        rank the plurality of different job postings based on the application likelihood scores.

2. The system of claim 1, wherein the system is further caused to:
    in the training phase:
        for one or more of the sample job postings, feed the sample user data associated with the corresponding sample job posting and the indications associated with the sample job posting into the machine learning algorithm to train a per-job portion of the job posting result ranking model.

3. The system of claim 2, wherein the indications as to which users interacted with which sample job posting include implicit indications.

4. The system of claim 2, wherein the indications as to which users interacted with which sample job posting include indications that users applied to corresponding sample job postings.

5. The system of claim 2, wherein the system is further caused to:
    in the training phase:
        for each of one or more job cohorts to which a sample job posting belongs, feed the sample user data associated with the corresponding sample job postings in the corresponding job cohort and the indications associated with the corresponding job cohort into the machine learning algorithm to train a per-job-cohort portion of the job posting result ranking model.

6. The system of claim 1, wherein the job posting result ranking model is optimized by optimizing for global features and per-feature queries for each query while holding all other variables fixed.

7. The system of claim 2, wherein the sample user data further includes sample user profiles.

8. A computerized method, comprising in a training phase:
obtaining training data comprising sample job postings, sample user data corresponding to users, and indications as to which of the sample job postings were interacted with by which users;
feeding the training data into a machine learning algorithm to train a global portion of a job posting result ranking model to output job posting application likelihood scores for an input job posting and an input user;
for each of one or more cohorts, a cohort comprising a plurality of users, feed the sample job postings that were interacted with by users of the corresponding cohort into the machine learning algorithm to train a per-user-cohort portion of the job posting result ranking model; and
for one or more of the users, feeding the sample job postings associated with the corresponding user and the indications associated with the user into the machine learning algorithm to train a per-user portion of the job posting result ranking model;
in a prediction phase:
obtaining an identification of a first user of an online service;
retrieving, using the identification, user data for the first user;
identifying one or more cohorts for the first user based on information in a user profile corresponding to the user;
for each of a plurality of different job postings, passing the corresponding job posting, the user data for the first user, and the one or more identified cohorts to the job posting result ranking model to generate a job posting application likelihood score for the job posting and the first user; and
ranking the plurality of different job postings based on the application likelihood scores.

9. The method of claim 8, further comprising:
in the training phase:
for one or more of the sample job postings, feed the sample user data associated with the corresponding sample job posting and the indications associated with the sample job posting into the machine learning algorithm to train a per-job portion of the job posting result ranking model.

10. The method of claim 9, wherein the indications as to which users interacted with which sample job posting include implicit indications.

11. The method of claim 9, wherein the indications as to which users interacted with which sample job posting include indications that users applied to corresponding sample job postings.

12. The method of claim 9, further comprising:
in the training phase:
for each of one or more job cohorts to which a sample job posting belongs, feeding the sample user data associated with the corresponding sample job postings in the corresponding job cohort and the indications associated with the corresponding job cohort into the machine learning algorithm to train a per-job-cohort portion of the job posting result ranking model.

13. The method of claim 8, wherein the job posting result ranking model is optimized by optimizing for global features and per-feature queries for each query while holding all other variables fixed.

14. The method of claim 9, wherein the sample user data further includes sample user profiles.

15. A non-transitory machine-readable storage medium comprising instructions which, when implemented by one or more machines, cause the one or more machines to perform operations comprising:
in a training phase:
obtaining training data comprising sample job postings, sample user data corresponding to users, and indications as to which of the sample job postings were interacted with by which users;
feeding the training data into a machine learning algorithm to train a global portion of a job posting result ranking model to output job posting application likelihood scores for an input job posting and an input user;
for each of one or more cohorts, a cohort comprising a plurality of users, feed the sample job postings that were interacted with by users of the corresponding cohort into the machine learning algorithm to train a per-user-cohort portion of the job posting result ranking model; and
for one or more of the users, feeding the sample job postings associated with the corresponding user and the indications associated with the user into the machine learning algorithm to train a per-user portion of the job posting result ranking model;
in a prediction phase:
obtaining an identification of a first user of an online service;
retrieving, using the identification, user data for the first user;
identifying one or more cohorts for the first user based on information in a user profile corresponding to the user;
for each of a plurality of different job postings, passing the corresponding job posting, the user data for the first user, and the one or more identified cohorts to the job posting result ranking model to generate a job posting application likelihood score for the job posting and the first user; and
ranking the plurality of different job postings based on the application likelihood scores.

16. The non-transitory machine-readable storage medium of claim 15, further comprising:
in the training phase: for one or more of the sample job postings, feed the sample user data associated with the corresponding sample job posting and the indications associated with the sample job posting into the machine learning algorithm to train a per-job portion of the job posting result ranking model.

17. The non-transitory machine-readable storage medium of claim 16, wherein the indications as to which users interacted with which sample job posting include implicit indications.

18. The non-transitory machine-readable storage medium of claim 16, wherein the indications as to which users interacted with which sample job posting include indications that users applied to corresponding sample job postings.

19. The non-transitory machine-readable storage medium of claim 16, further comprising:
for each of one or more job cohorts to which a sample job posting belongs, feeding the sample user data associated with the corresponding sample job postings in the corresponding job cohort and the indications associated with the corresponding job cohort into the machine learning algorithm to train a per-job-cohort portion of the job posting result ranking model.

20. The non-transitory machine-readable storage medium of claim 15, wherein the job posting result ranking model is optimized by optimizing for global features and per-feature queries for each query while holding all other variables fixed.

* * * * *